Figure 1:
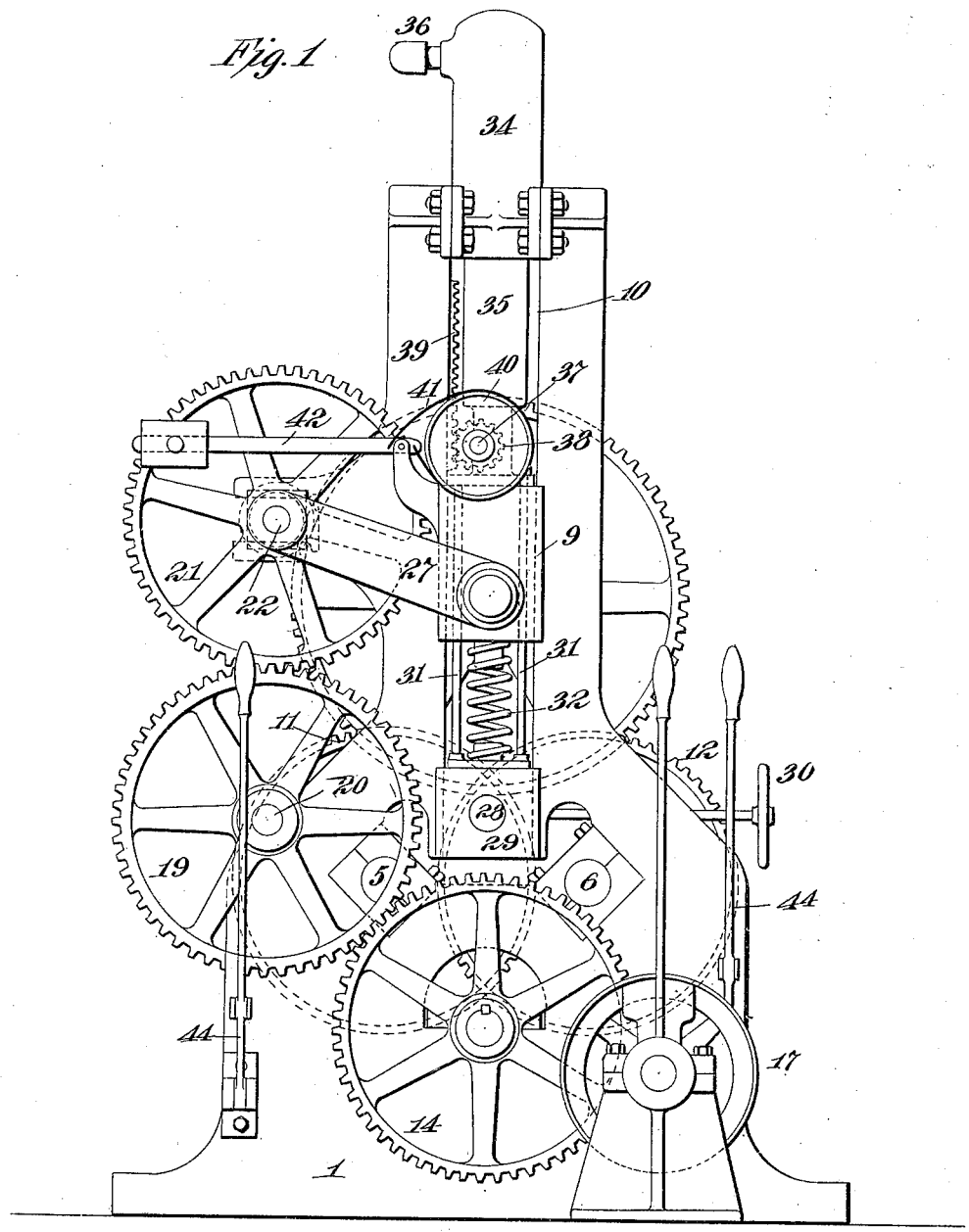

No. 662,888. Patented Nov. 27, 1900.
M. SWENSON.
APPARATUS FOR BALING COTTON.
(Application filed Feb. 24, 1900.)
(No Model.) 4 Sheets—Sheet 3.

No. 662,888. Patented Nov. 27, 1900.
M. SWENSON.
APPARATUS FOR BALING COTTON.
(Application filed Feb. 24, 1900.)
(No Model.) 4 Sheets—Sheet 4.

Witnesses:

Inventor
Magnus Swenson
by Frank L. Dyer
Att'y

United States Patent Office.

MAGNUS SWENSON, OF CHICAGO, ILLINOIS, ASSIGNOR TO THE AMERICAN COTTON COMPANY, OF NEW YORK, N. Y.

APPARATUS FOR BALING COTTON.

SPECIFICATION forming part of Letters Patent No. 662,888, dated November 27, 1900.

Application filed February 24, 1900. Serial No. 6,384. (No model.)

*To all whom it may concern:*

Be it known that I, MAGNUS SWENSON, a citizen of the United States, residing at Chicago, in the county of Cook and State of Illinois, have invented a certain new and useful Improvement in Apparatus for Baling Cotton, of which the following is a specification.

My invention relates to new and useful improvements in apparatus for making cylindrical cotton-bales by convolutionally winding a continuous or substantially continuous sheet or bat of cotton while it is subjected to heavy pressure; and the invention relates particularly to presses of this type employing more than two baling-rolls whereby the forming bale will be subjected to pressure at at least three points in its periphery, thus dispensing with the employment of a compressing-belt.

The object of the invention is to provide a press of this type which shall be simple in construction and effective in use.

The principal objection which has been met in practice in the operation of cylindrical baling-presses employing three or four rolls has been the difficulty of starting the bale in its formation, since if the baling-rolls are large enough for effective work there results between them a comparatively large space or pocket in which the first increments of the bale are received. If, therefore, a core is used on which the bale is formed, it requires to be made of a prohibitively large diameter to enable the first layers of the bale to be properly compressed by the baling-rolls.

Broadly stated, my invention comprises three or a greater number of baling-rolls of sufficient diameter as to be properly operative, a core on which the bale is formed, and means for yieldingly maintaining the core in engagement with or proximity to at least one of the baling-rolls, whereby the sheet or bat of cotton will be convolutionally wound on the core and will be subjected initially to the pressure of the yielding core-supporting devices, the growth of the bale moving the core against the tension of such devices until finally all of the baling-rolls are engaged by the bale to apply pressure thereon and to complete its final formation.

Preferably the invention comprises in a broad sense two baling-rolls mounted in fixed bearing-boxes placed side by side, a movable baling-roll movable vertically toward and away from the stationary baling-rolls in a line perpendicular to the plane of the axes of the latter rolls and bisecting the axes of such rolls, and a core carried in movable bearings, which latter are yieldingly connected to the bearings of the movable roll, said core being initially maintained in contact or proximity with the peripheries of the stationary baling-rolls, whereby the inner layers of the bale will be formed by the winding action of the stationary baling-rolls, causing the core and the forming bale to be moved bodily upward against the tension of the yielding core-supporting devices until the bale engages the movable baling-roll, which then commences to recede against the stress of suitable pressure-producing devices, and which in conjunction with the stationary baling-rolls serve to complete the formation of the bale.

My invention contemplates novel devices for yieldingly supporting the movable bearings of the core from the movable bearings of the movable baling-roll, said devices comprising, essentially, suitable guides which connect the adjacent bearing-boxes and permit relative movement thereof, and springs interposed between each pair of bearing-boxes to hold them normally separated and to apply pressure to the forming bale during its preliminary stage. The invention also contemplates improvements in the mechanism for driving the rolls whereby they will be rotated at the same surface speed, while at the same time the movable roll or rolls will be permitted to recede with the forming bale away from the stationary roll or rolls. It contemplates improvements in the devices by which the bale after its formation may be removed from the press. It contemplates improvements in the devices by which the movable roll or rolls may be properly handled in the baling operation, as well as other details of improvement, all as will be more fully hereinafter described and claimed.

In order that the invention may be better understood, attention is directed to the accompanying drawings, forming a part of this specification, and in which—

Figure 2:
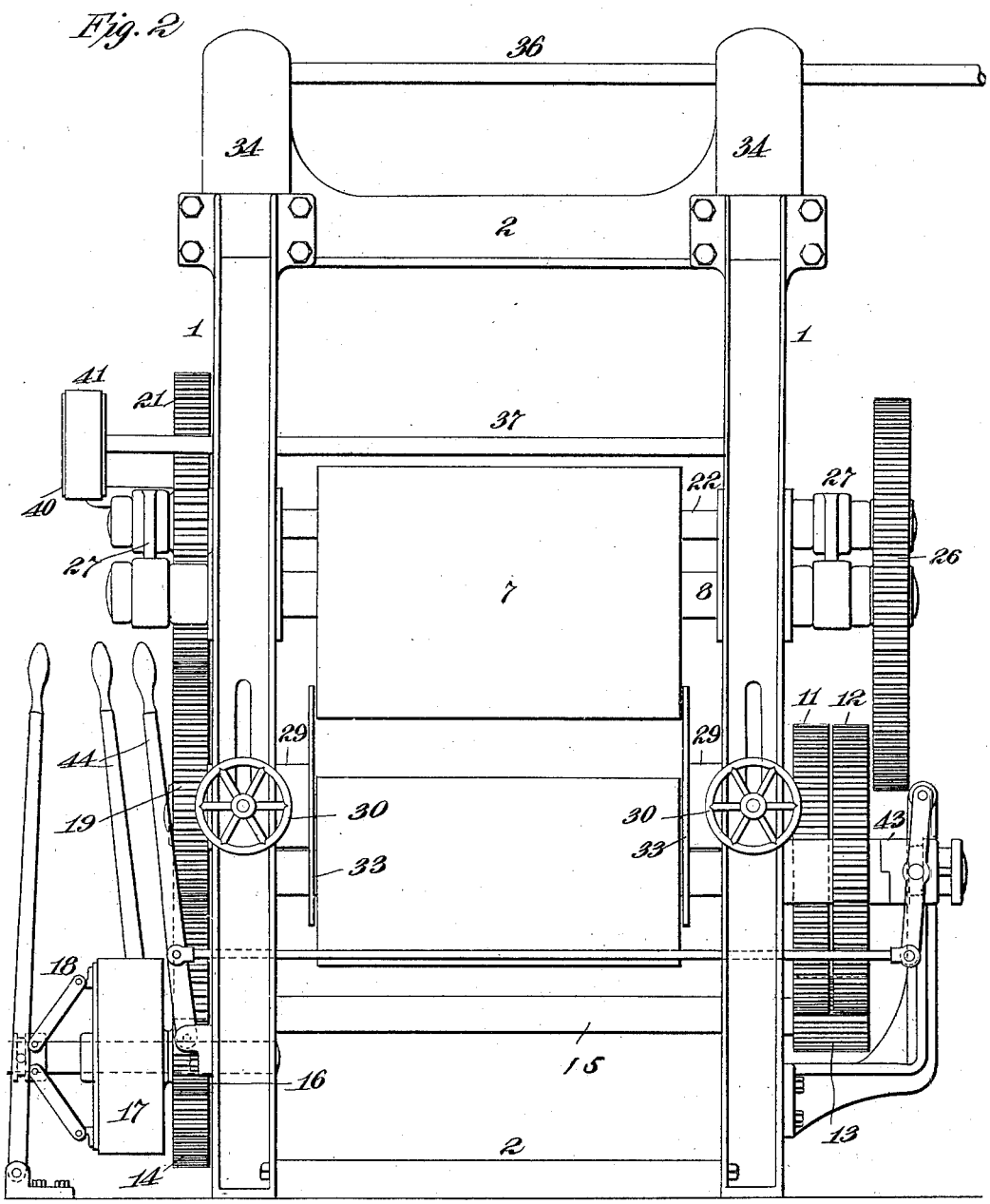
Figure 3:
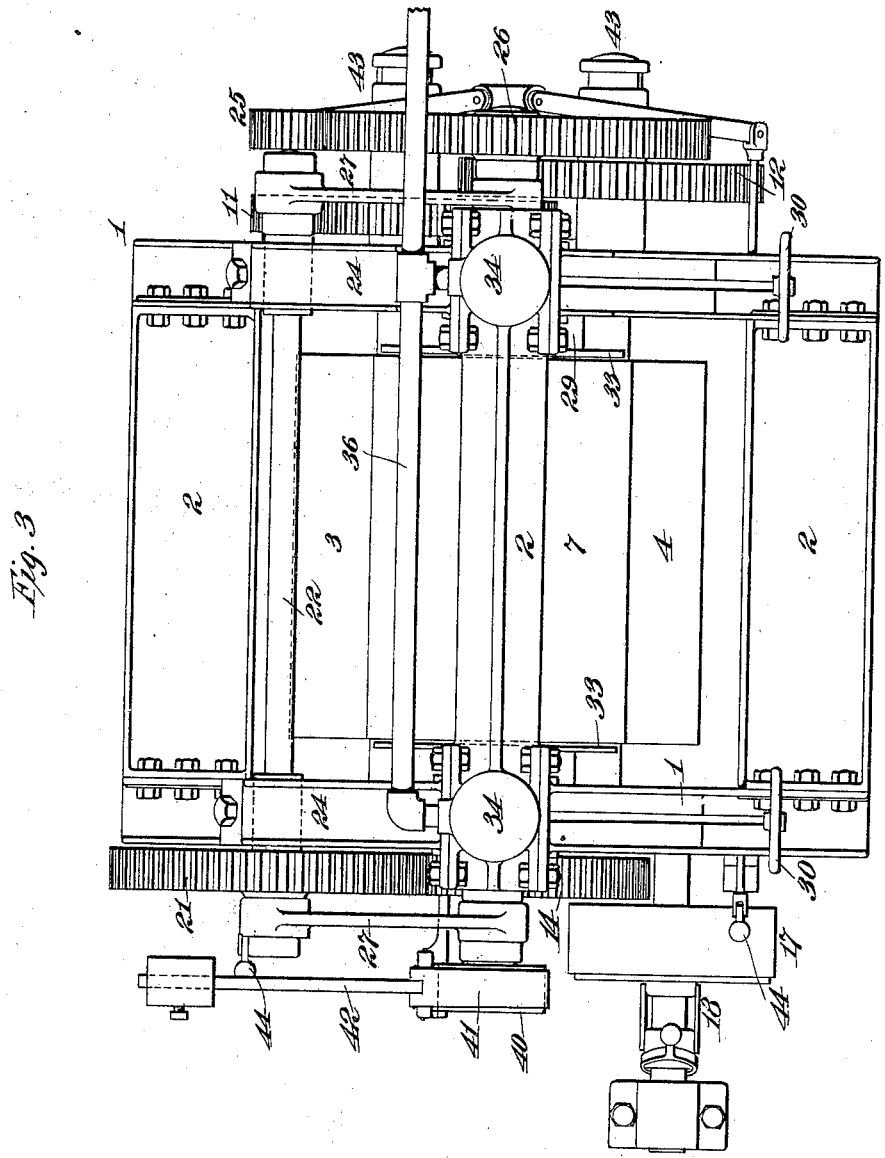
Figure 4:
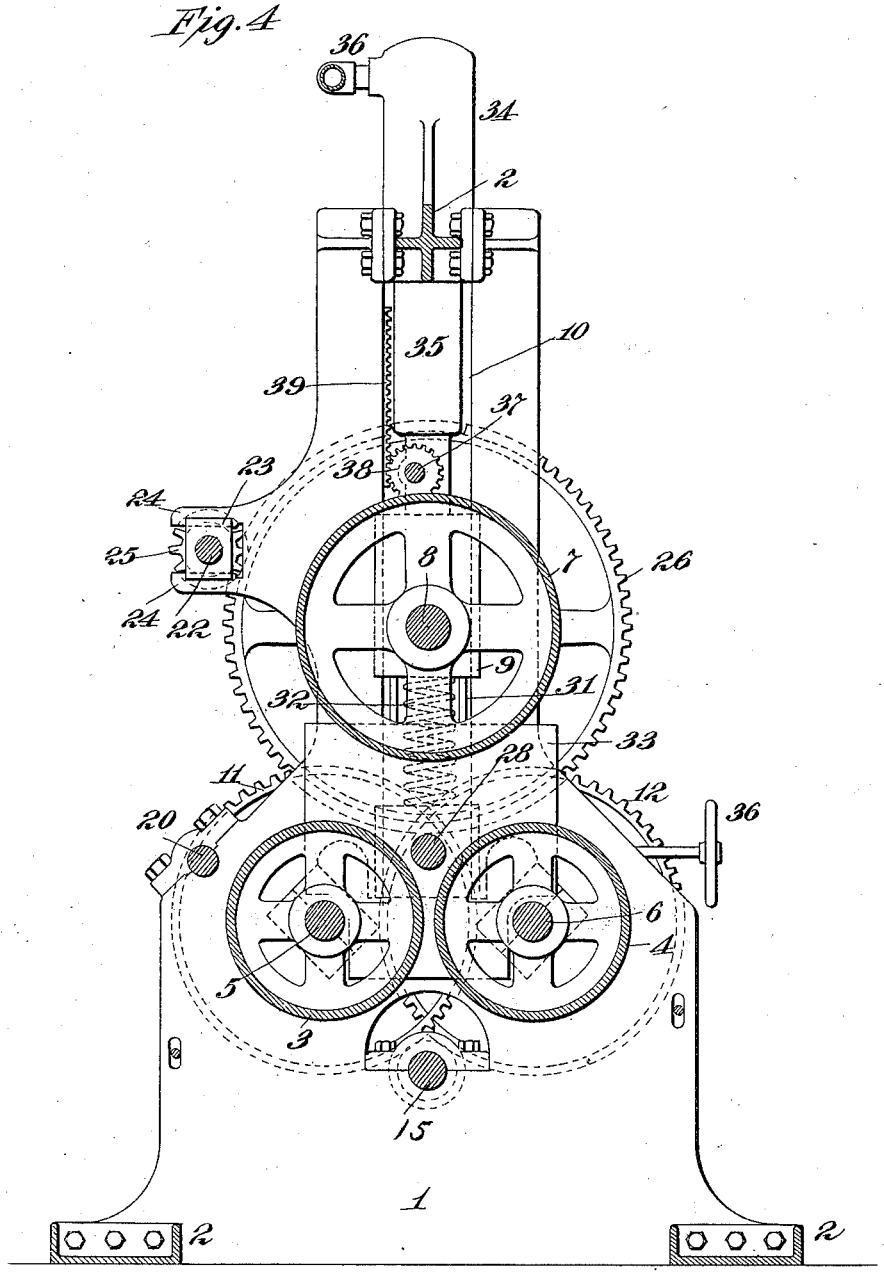

Figure 1 is a side view of a three-roll press embodying my present improvements; Fig. 2, a front view thereof; Fig. 3, a plan, and Fig. 4 a vertical section.

In all of the above views corresponding parts are represented by the same numerals of reference.

1 1 are suitable side frames which are connected together by suitable cross-frames 2 2.

3 and 4 represent two baling-rolls mounted on shafts 5 and 6 in stationary bearings in the side frames 1 1.

7 represents a movable baling-roll the shaft 8 of which is carried in bearings 9, which work in guides 10 in the side frames 1. The movable baling-roll 7 is preferably located above the stationary baling-rolls 3 and 4 and travels in a plane perpendicular to that of the stationary baling-rolls and centrally above the same. The shafts 5 and 6 of the stationary baling-rolls are provided at one end with gears 11 12, which gears preferably overlap, as shown, whereby they may be made of a maximum diameter. A single broad-faced pinion 13 engages with and drives simultaneously both of the gears 11 12, said pinion being carried on a counter-shaft 15, mounted in the side frames 1 and carrying at its other end a gear 14, which is driven from a pinion 16, adapted to be connected to the main belt or drive wheel 17 by a friction-clutch 18, operated by the usual lever, as shown. The gear 14 drives a gear 19, which is carried on a shaft 20, mounted in the side frames 1 1. The gear 19 drives a gear 21, carried on a shaft 22, having bearings in bearing-boxes 23, which latter work in guides 24 24, formed on the side frames 1, as shown. The shaft 22 carries a pinion 25, which drives a gear 26 on the shaft 8 of the movable baling-roll. The pinion 25 is kept in engagement with the gear 26, and the shafts 22 and 8 are maintained always parallel by links 27, which connect the said shafts at both sides of the machine, as shown. The guides 24 preferably occupy a position in a plane intermediate of the extreme movements of the shaft 8 in operation, whereby the recession of the movable baling-roll will result in a short outward movement of the shaft 22 and a corresponding inward movement thereof, these movements being too slight to affect the engagement between the gears 19 and 21.

28 represents a core which is removably carried in any suitable way in bearing-boxes 29, the latter working in the guides 10, as shown. The usual hand-wheels 30 may be employed, as is common in the art, to operate the disengaging mechanism of the core.

31 31 are two guides which connect the bearing-boxes 9 and 29 at each side of the machine and permit said bearing-boxes to move relatively to each other. Springs 32 are interposed between said bearing-boxes to maintain them normally separated and to impart the preliminary pressure to the bale, as will be explained. The bearing-boxes 29 carry the usual head-plates 33 for building up the ends of the bale, as is common.

In order to apply pressure to the forming bale, any desired pressure mechanism can be employed. I illustrate two hydraulic cylinders 34 34, the pistons 35 of which connect directly with the bearings 9. The exit-pipe 36, with which both of the cylinders 34 are connected, may be provided with any desired form of relief-valve or air-chamber to resist the flow of the liquid from the cylinders.

In order that the movements of the movable baling-roll may be kept parallel with the stationary baling-rolls, I prefer to carry in bearings above the boxes 9 a shaft 37, carrying a pinion 38 near each end, said pinion engaging with a rack 39, as shown. The shaft 37 preferably carries a brake-wheel 40, with which a brake-band 41 coöperates, said band being connected to a lever 42, pivoted upon an arm from one of the bearing-boxes 9. The force of the brake is sufficient to prevent the baling-roll 7 from descending when the bale has been removed. Any other suitable device may be employed for effecting this end.

In order to remove the finished bale from the press after it has been covered and bound, I prefer to employ devices by which one or more of the baling-rolls may be stopped rotating, so that the other roll or rolls will roll the bale out from between the baling-rolls in the usual way. I illustrate means for stopping the rotation of both of the stationary baling-rolls, said means comprising clutches 43, which connect the gears 11 and 12 with the shafts 5 and 6 of the stationary rolls, said clutches being operated from levers 44, as shown.

The operation of the improved baling-press will be as follows, assuming the parts at the commencement of the formation of the bale to be in the positions shown: Power is applied to the belt-wheel 17 to rotate the baling-rolls, through the gearing illustrated, in the direction of the arrows. The movable baling-roll 7 occupies its lower position, and the tension of the springs 32 has forced the core 28 downward until it almost touches or does actually touch the peripheries of the baling-rolls 3 and 4. A continuous sheet or bat of cotton is now introduced above the baling-roll 3 and commences to wind upon the core in the usual way. As the bale begins to form the core 28 will recede from the stationary baling-rolls and pressure will be applied to the cotton, due to the tension of the springs 32. When sufficient cotton has been wound upon the core as to engage the movable baling-roll 7, the latter will assist in rotating and applying pressure to the forming bale. The continued growth of the bale will be opposed by the pressure-producing mechanism, (in the present instance the hydraulic cylinders 34,) and the desired compression will be imparted to the bale. When the bale has been completed, it is covered in the usual way and is removed by stopping one or both of the baling-rolls 3 and 4, whereupon (the core having been first released) the continued rotation of the baling-roll 7 will roll the bale out above the baling-roll 4, as will be obvious. When the bale has been removed from the press, the brake 40 41 will prevent the movable baling-roll 7 from descending. A new core is now inserted in position, and the baling-roll 7 is returned to its lower position by permitting the hydraulic pressure to again enter the cylinders.

Having now described my invention, what I claim as new, and desire to secure by Letters Patent, is as follows:

1. In a baling apparatus, the combination of two baling-rolls mounted in fixed bearing-boxes, side by side, a baling-roll movable vertically toward and away from the stationary baling-rolls, a core on which the bale is formed, springs connecting the core with the bearings of the movable roll, and guides connecting the core-bearings with the bearings of the movable roll permitting a relative movement of said bearings, substantially as set forth.

2. In a baling apparatus, the combination of a pair of baling-rolls mounted in stationary bearing-boxes, a movable baling-roll coöperating with the stationary baling-rolls, gears on the shafts of the stationary baling-rolls, a fixed counter-shaft, a pinion engaging both of said gears and carried by the counter-shaft, connections between the counter-shaft and the movable roll for rotating the latter, a gear carried by the shaft of the movable baling-roll, a sliding counter-shaft mounted in movable bearings, a pinion on the sliding counter-shaft for engaging the gear on the movable baling-roll, and connections between the fixed counter-shaft and the sliding counter-shaft, substantially as set forth.

3. In a baling apparatus, the combination of a pair of baling-rolls mounted in stationary bearing-boxes, a movable baling-roll coöperating with the stationary baling-rolls, overlapping gears on the shafts of the stationary baling-rolls, a fixed counter-shaft, a double-faced pinion engaging both of the overlapping gears and carried by the counter-shaft, connections between the counter-shaft and the movable roll for rotating the latter, a gear carried by the shaft of the movable baling-roll, a sliding counter-shaft mounted in movable bearings, a pinion on the sliding counter-shaft engaging the gear on the movable baling-roll, and connections between the fixed counter-shaft and the sliding counter-shaft, substantially as set forth.

4. In a baling apparatus, the combination of a stationary baling-roll, a movable baling-roll mounted above the same and coöperating therewith, a single-acting hydraulic cylinder for applying pressure to the movable baling-roll, and means for resisting downward movement of the movable baling-roll, substantially as set forth.

5. In a baling apparatus, the combination of a stationary baling-roll, a movable baling-roll mounted above the same and coöperating therewith, a single-acting hydraulic cylinder for applying pressure to the movable baling-roll, and a brake device carried with the movable baling-roll for resisting downward movement thereof, substantially as set forth.

This specification signed and witnessed this 20th day of February, 1900.

MAGNUS SWENSON.

Witnesses:
B. A. JOHNSTON,
JAS. H. GIBSON.